United States Patent Office 3,359,852
Patented Dec. 26, 1967

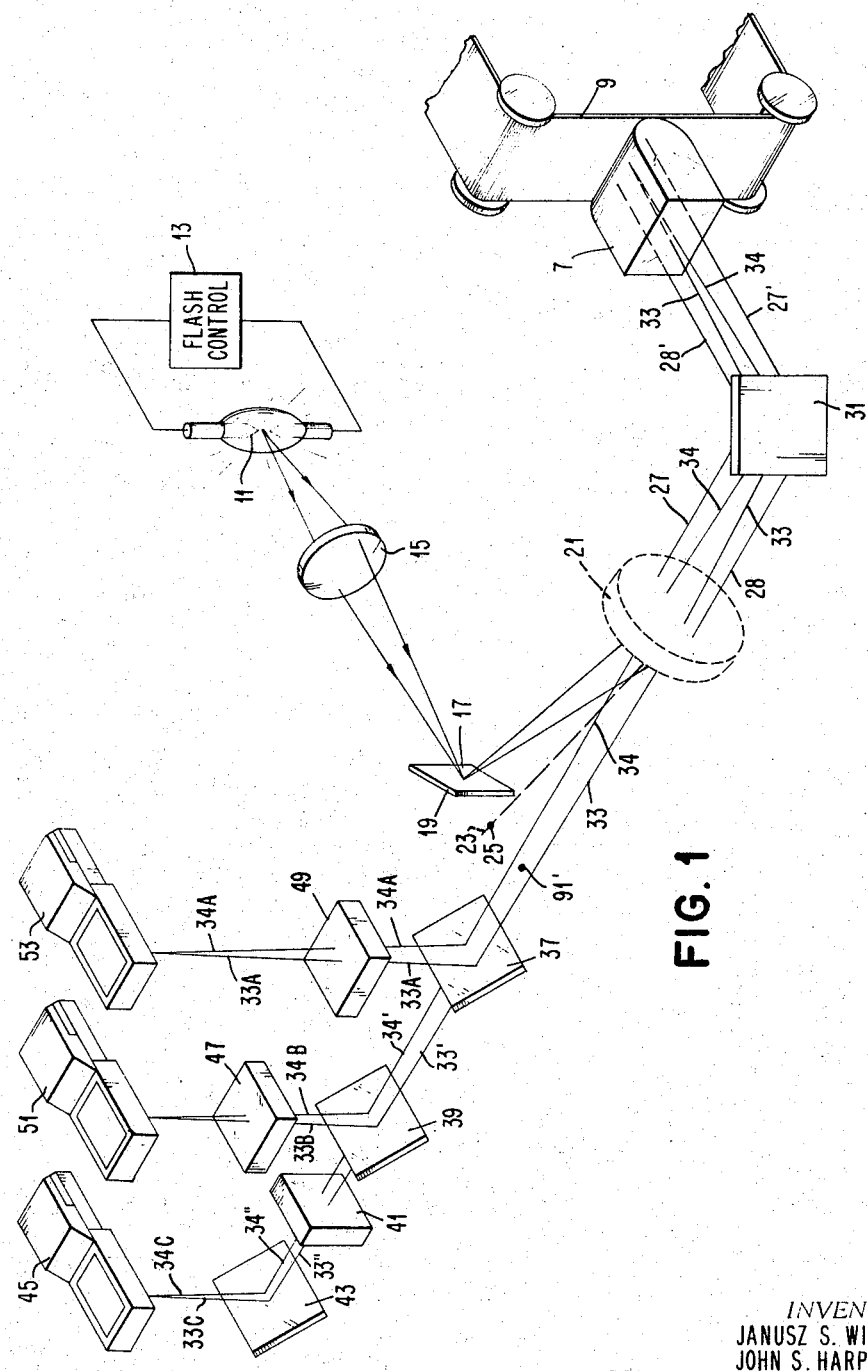

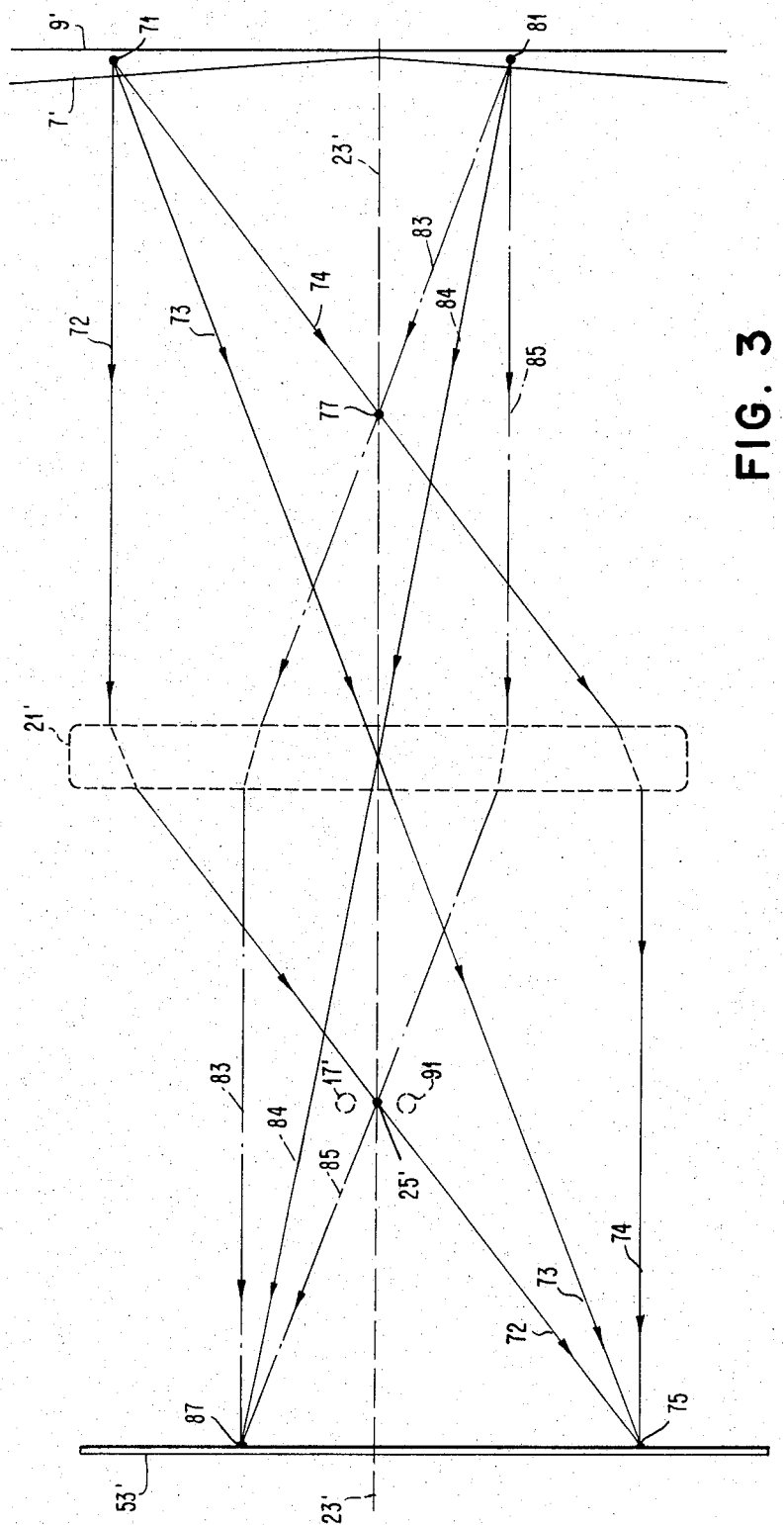

3,359,852
MULTIPLE COLOR, MULTIPLE BEAM
INTERFEROMETER
Janusz S. Wilczynski, Ossining, and John S. Harper,
Carmel, N.Y., assignors to International Business Machines Corporation, Armonk, N.Y., a corporation of
New York
Filed Oct. 22, 1964, Ser. No. 405,795
3 Claims. (Cl. 88—14)

ABSTRACT OF THE DISCLOSURE

An optical apparatus for enabling the measurement of the distance between two surfaces spaced from each other through the use of reflected light containing at least two different colors to produce interference patterns for the colors. Where the fringes in these patterns coincide, the absolute distance between the surfaces is a multiple of the respective half wavelengths of each of the respective colors. A point source of light is developed which is offset from the axis of the apparatus to effect an optimum utilization of light energy in the production of the interference patterns.

This invention relates to apparatus for measuring the distance between two surfaces, and more particularly to apparatus for producing interference patterns which may be analyzed to determine the absolute distance between two surfaces, one of which may be moving with respect to the other.

The separation between two surfaces has been examined by reflecting light from the surfaces and developing an interference pattern. One example of this procedure is the development of Newton rings. When a spherically shaped glass is placed on top of a flat surface and light is directed through the glass, reflections from the spherical surface of the glass and reflections from the flat surface interfere producing dark circular fringes concentric with the point of contact between the two surfaces. The absolute distance between the two surfaces at any point can be determined by counting the number of fringes from the center spot and multiplying it by one-half of the wave length of the reflected light.

However, a problem occurs where no point contact or other reference distance between the two surfaces is known. For example, where one surface is moving or in a transient state, the absolute distance between two surfaces cannot be determined by the elementary Newton ring technique. While an interference pattern can be developed between two moving surfaces, there may or may not be a point of contact between the two surfaces. Therefore the interference pattern contains no starting point for counting fringes.

One method of solving the problem of establishing a reference point in the interference pattern is set forth in the commonly assigned co-pending application Ser. No. 363,368 entitled "Optical Apparatus and Method for Mapping and Measuring Small Separations" by Louis D. Lipschutz and Tseng K. Chow. The two surfaces are illuminated with light containing at least two different colors and interference patterns for both colors are developed. The two patterns are studied to determine the location where fringes in both patterns are substantially coincident. At this location the absolute distance between the two surfaces is a multiple of the half wavelengths of each color. Ordinarily the exact multiple can be determined by knowing the approximate separation between the surfaces at this location or other physical characteristics of the surface. This location serves as the reference point for counting the number of fringes to any other point in the pattern and thereby determining the absolute distance between surfaces at these points.

The present application includes apparatus embodying the basic multi-color interferometric principle disclosed in application Ser. No. 363,368 and shown in FIG. 1 thereof. The present invention is directed to an implementation of this principle and has been found to be successful in operation and efficient in construction and use.

The present invention is also directed to the solution of two problems, viz. that of illuminating the surfaces substantially uniformly with coherent light, and second, the problem of projecting a sufficient amount of light from the surfaces to a camera for recordation.

It is an object of the present invention to provide apparatus for generating interference patterns.

Another object of the present invention is to provide apparatus for generating multi-color interference patterns.

Still another object of the present invention is to provide apparatus for generating multi-color interference patterns suitable for use in determining the separation between two surfaces.

A further object of the present invention is to provide apparatus capable of producing interference patterns suitable for use in determining the separation between two relatively moving surfaces.

It is another object of the present invention to provide optical apparatus capable of illuminating surfaces and projecting the light reflected therefrom onto recording surfaces.

Another object of the present invention is to provide optical apparatus for substantially uniformly illuminating surfaces and projecting the reflected light with sufficient intensity upon photographic material for effective recordation.

These and other objects of the present invention are accomplished by providing a source of light containing at least two colors. The light is flashed instantaneously upon two surfaces. The reflected light is split into two or more paths each one leading to a photographic material.

Filters are placed between the photographic material and the surfaces so that different colored light is transmitted along each of the paths to the recording surfaces. In this manner interference patterns for each of the colors are produced which may be interpreted to determine a reference point for measuring the absolute distance between the two surfaces.

In accordance with another aspect of the present invention an optical system is incorporated in the apparatus described above which substantially uniformly illuminates the surfaces with high intensity light. A lens is provided having an axis, a primary focal point located on the axis, and a pair of conjugate planes, the first plane being located on one side of the lens and the second plane being located on the other side of the lens along with the primary focal point. A point light source is placed near the primary focal point and slightly offset from the axis. Light from the source is collimated by the lens and directed onto the two surfaces. The reflected light passes back through the lens and is projected onto the recording material. By placing the surfaces in the first conjugate plane and the recording material in the second conjugate plane the light reflected from the surfaces is imaged on the recording surfaces.

The point source is set slightly off the axis so that the main energy portion of the reflected light is refocused near the point source and off-set on the opposite side of the axis from the point source. Therefore most of the light energy can pass by the point source and be imaged on the photographic material.

The foregoing and other objects, features and advantages of the invention will be apparent from the following more particular description of a preferred embodiment of the invention, as illustrated in the accompanying drawings.

In the drawings:

FIG. 1 is a schematic of an apparatus embodying the present invention;

FIG. 3 is a diagram illustrating the typical manner in which light is refracted by a lens.

Figure 2A:
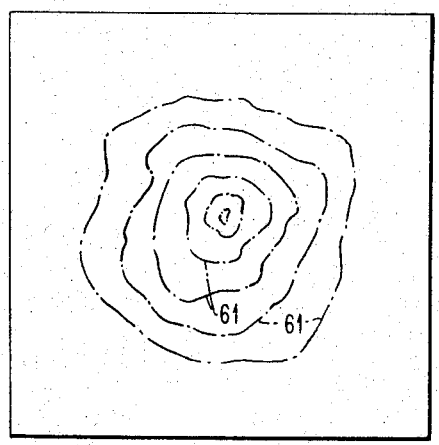
FIGS. 2a through 2c are diagrams illustrating the interference patterns produced by three different colors.

The apparatus of FIG. 1 is used to determine the separation between a transparent member 7 shaped in the form of a magnetic head and a magnetic tape 9. When designing the shape of a magnetic head a transparent model is often formed so that various contours can be tested to determine the fluid dynamic properties of a moving tape and head.

A flash tube 11 is operated by a flash control 13 to produce a substantially instantaneous burst of light containing a number of colors. The light is collected by lens 15 and focused at a point 17 on a mirror 19.

The point source 17 is reflected into a lens 21 illustrated in broken line in FIG. 1. The lens 21 may be composed of a number of optical elements. Any suitable lens having an axis 23 and an external principal focal point 25 may be employed. The point source 17 is offset from axis 23, the distance being exaggerated in FIG. 1.

Since the point source 17 is located near the principal focal point 25, light rays, such as rays 27 and 28 emerging from lens 21 are collimated into substantially parallel rays. The rays 27 and 28 are reflected from a mirror 31 and are illustrated as a pair of rays 27' and 28' respectively, in FIG. 1.

Light is reflected and scattered back from the surface of head 7 and the adjacent surface of tape 9. An example of the reflected and scattered light is illustrated in FIG. 1 by the pair of rays 33 and 34 which are reflected from a point centered between rays 27' and 28'.

The rays 33 and 34 are turned by mirror 31 and directed through lens 21. The rays 33 and 34 emerge from lens 21 and strike a dichroic mirror 37. Mirror 37 performs the function of a beam splitter, reflecting colors above a certain wavelength and transmitting colors of a smaller wavelength. The reflected colors are illustrated in FIG. 1 by the rays 33A and 34A, while the transmitted colors are represented by the rays 33' and 34'.

Another dichroic mirror 39 performs the same beam splitting function reflecting colors below a certain wavelength along the path represented by a pair of rays 33B and 34B, while transmitting lower frequency colors along a path represented by a pair of rays 33" and 34".

A filter 41 transmits color within a certain wavelength range along the path illustrated by a pair of rays 33" and 34" which are reflected by conventional mirror 43 along the path illustrated by a pair of rays 33C and 34C onto a camera 45. Other filters 47 and 49 pass different colors to cameras 51 and 53 respectively.

The cameras 45, 51 and 53 are each located so that the surfaces of head 7 and tape 9 are imaged on photographic material contained in the cameras 45, 51 and 53. This is illustrated in FIG. 1 by the rays 33 and 34 which diverge from a point on the surfaces of head 7 and tape 9 and converge at a point on the photographic material of each camera 45, 51 and 53. The proper convergence may be accomplished by setting the surfaces of head 7 and tape 9, and the surfaces of the photographic material of cameras 45, 51 and 53 in conjugate planes of the lens 21.

Figure 2B:
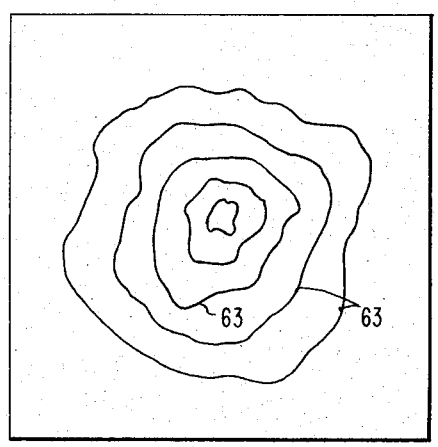
Figure 2C:
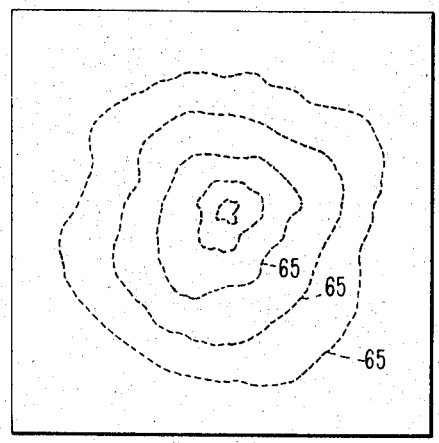

The interference patterns shown in FIGS. 2a–2c illustrate typical patterns developed simultaneously by cameras 45, 51 and 53. Fringes 61 appearing in FIG. 2a are more closely spaced than fringes 63 of FIG. 2b or fringes 65 of FIG. 2c. Therefore the color producing the pattern in FIG. 2a is the shortest wavelength and therefore is developed by camera 51. The pattern of FIG. 2c is produced by the longest wavelength and is developed by camera 53, while the pattern of FIG. 2b is developed by camera 45.

Figure 2D:
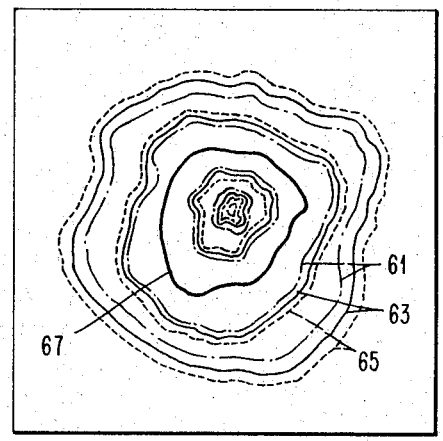
FIG. 2d is a diagram illustrating the superimposed interference patterns of FIGS. 2a–2c.

The interference patterns of FIGS. 2a–2c may be interpreted to determine the location of a reference fringe by superimposing the three patterns as shown in FIG. 2d. A reference fringe 67 appears where a fringe from all three of the patterns shown in FIGS. 2a–2c overlap. At the location of fringe 67 the separation between head 7 and tape 9 is a multiple of the three half wavelengths of the colors producing the patterns in FIGS. 2a–2c. The number of this multiple can be determined by knowledge of the shape of the surfaces under observation and the approximate separation between them. Since the unique multiple occurs infrequently (relative to the frequency of occurrence of the fringes for any single color) the exact number of the multiple producing the reference fringe 67 is ordinarily determinable.

Another feature of the present invention is achieved by off-setting the point source 17 from the axis 23 of lens 21. The effect of this off-set can be described by first illustrating the operation of a typical lens such as lens 21' shown in broken line in FIG. 3. Lens 21' includes an axis 23' and a primary focal point 25' lying on axis 23'. Two surfaces 7' and 9' are separated by a small space and lie in a plane substantially perpendicular to the axis 23'. A photographic material 53' lies in a plane perpendicular to the axis 23'. The two planes, one including material 53' and the other effectively including the surfaces 7' and 9' are conjugate planes of lens 21'.

To illustrate the operation of the lens 21', a point 71 is selected in the space between surfaces 7' and 9'. Although light is reflected from the surfaces 7' and 9' rather than from a point therebetween, 71 can be considered to be the point from which light is reflected from both surfaces 7' and 9' since the separation is exaggerated in FIG. 1 (the normal separation is in the order of a few wavelengths of light).

Light reflected from 71 is dispersed in all directions. Rays 72–74 are typical rays reflected from point 71. Ray 72 travels parallel to the axis 23'. In accordance with the operation of lens 21' ray 72 is refracted through the primary focal point 25' striking the material 53' at a point 75.

Ray 74 is selected to pass through a secondary focal point 77 of lens 21'. Therefore ray 74 is refracted by lens 21' and emerges parallel to the optic axis 23'. Both rays 72 and 74 strike material 53 at the same point 75 since points 71 and 75 are conjugate points of lens 21'. Ray 73 also arrives at point 75.

Another point 81 is selected in the space between surfaces 7' and 9' to serve as an example of the operation of lens 21'. Rays 83–85 are dispersed from point 81. Ray 85 which is parallel to axis 23' passes through primary focal point 25' striking the photographic material 53' at a point 87. Ray 83 passes through secondary focal point 77, emerges parallel to axis 23', and strikes material 53' at point 87. Ray 84 also arrives at point 87.

It can be seen by the two examples illustrated in FIG. 3 that the light dispersed from all points along the surfaces 7' and 9' is imaged on the photographic material 53'. Further, rays such as 72 and 85 reflected from surfaces 7' and 9' parallel to axis 23' are focused at primary focal point 25'. If the surfaces 7' and 9' are illuminated with collimated light parallel to the axis 23' most of the energy in the light reflected from surfaces 7' and 9' is contained in the rays reflected parallel to the axis 23', such as rays 72 and 85. Accordingly most of the reflected energy is focused at primary focal point 25'. Therefore it is apparent that a light source or other object placed at primary focal point 25' would block most of the energy in the light traveling toward photographic material 53'.

Corresponding elements in FIG. 1 and FIG. 3 are identified with the same reference numerals. Mirrors 31 and 37 cause the optic axis of lens 21, as well as the light rays, to be turned 90°. However the operation of the lens 21 is the same as that described with respect to lens 21' of FIG. 3. The point source 17 is placed slightly off-set from the axis 23. Therefore the rays 27 and 28 are not precisely parallel to the axis 23. Likewise, the rays reflected from surfaces 7 and 9 which contain the maximum amount of energy are not exactly parallel to the optic axis 23. Referring to FIG. 3, if a point source of light were established at a point 17' slightly above the primary focal point 25', the rays reflected from surfaces 7' and 9' having the maximum energy would be inclined below the rays 72 and 85 thereby causing a focus of the high energy rays at a point 91.

This operation occurs in the system of FIG. 1 causing the high energy reflected waves to be focused at a point 91'. By making the mirror 19 sufficiently small so that it does not overlap the region of 91' most of the energy passes onto the cameras 45, 51 and 53.

The following table lists the various dimensions, parameters and other details of the apparatus shown in FIG. 1; the invention however is not limited to these values nor to any one of them:

| | |
|---|---|
| Lens 21 | 80 mm. focal length Zeiss Biometer lens. |
| Distance between primary focal point 25 and lens 21 | Approx. 55 mm. |
| Path length from cameras 45, 51 and 53 to lens 21 | Approx. 650 mm. |
| Path length from surfaces of head 7 and tape 9 to lens 21 | Adjusted for sharp image. |
| Distance between point 91' and point source 17 | Approx. 5 mm. |
| Length of flash from tube 11 | 0.5 to 3.0 microsec. |
| Photographic material used in cameras 45, 51 and 53 | Type 47 Polaroid. |
| Wavelength range reflected by mirror 37 | Above 5800 A. |
| Wavelength range reflected by mirror 39 | Below 4800 A. |
| Half peak range of wavelength of light passed by filter 41 | 5461±50 A. |
| Half peak range of wavelength of light passed by filter 47 | 4358±50 A. |
| Half peak range of wavelength of light passed by filter 49 | 6120±50 A. |

The apparatus of FIG. 1 causes the reflected light to be split along three separate paths arriving at three separate cameras 45, 51 and 53. A single camera can be used in accordance with the present invention by forming a three part filter which transmits only a single color through each part. One photographic recording surface receives light from the three parts of the filter and develops an interference pattern segmented into three sections. Most of the fringes are discontinuous at the lines where the sections meet. However a single continuous fringe extends through all three sections where the separation is a multiple of the half wavelengths of the three colors passed by the filter.

Instead of a flash control 13 a mechanical shutter can be used to illuminate the surfaces 7 and 9 instantaneously. Also where the light is initially polarized, a Kerr cell could be inserted in the path to perform the function of a light shutter. Of course, where the surfaces 7 and 9 are both stationary, it is not necessary to illuminate them in an instantaneous flash.

Still another modification can be made to the specific embodiment shown in FIG. 1 where the surface 9 is transparent. The cameras 45, 51 and 53 can be placed on the opposite side of the surface 9 to record the light transmitted through the surfaces 7 and 9.

While the invention has been particularly shown and described with reference to a preferred embodiment thereof, it will be understood by those skilled in the art that various changes in form and details may be made therein without departing from the spirit and scope of the invention.

What is claimed is:

1. Apparatus for producing interference pattern representative of the distance between a surface of a transparent subject and a nearby surface of a reflective subject comprising:
    collimating lens means having a primary focal point;
    a source of light positioned offset from said focal point, said source providing, at least, lights of three different predetermined wavelengths;
    means associated with said light source for focusing said light near said focal point;
    said collimating lens means being disposed to apply said light to said surfaces in such a way as to produce interference patterns in the light reflected from said surfaces;
    a plurality of respectively aligned dichroic light reflecting and transmitting means disposed in the path of said reflected light transmitted through said collimating lens means, each of said dichroic means reflecting one of said predetermined wavelengths and transmitting the remainder of said light; and
    a plurality of light sensitive recording means, each disposed in the path of one of said predetermined wavelengths of light reflected from one of said dichroic means for separately recording the complete interference patterns contained in the light reflected from each dichroic means;
    said interference patterns being representative of the distance between said surfaces.

2. Apparatus as defined in claim 1 including a plurality of filters, each of said filters being positioned between one of said dichroic means and the associated one of said light recording means and having the optical characteristic to transmit light of the corresponding wavelength.

3. Apparatus as defined in claim 1 in which said source of light is a flash source to enable said light sensitive recording means to have recorded thereon the interference patterns of said surfaces when there is relative motion between said surfaces.

References Cited

UNITED STATES PATENTS 2,993,404 7/1961 Rouy _____ 88—14
3,028,782 4/1962 Bernhardt et al. _____ 88—14

DAVID H. RUBIN, *Primary Examiner.*

JEWELL H. PEDERSEN, *Examiner.*

R. J. STERN, *Assistant Examiner.*